March 20, 1945.  C. G. COOPER  2,371,805
CONDUIT COUPLING MEANS
Filed Aug. 28, 1942
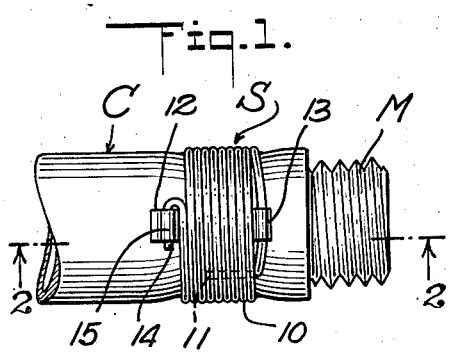
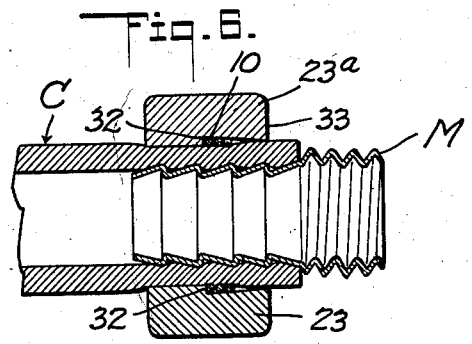
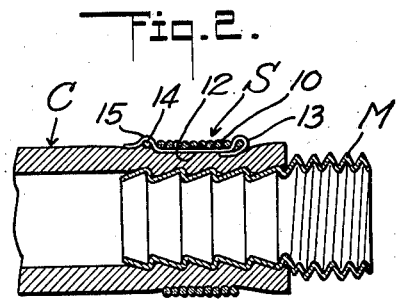
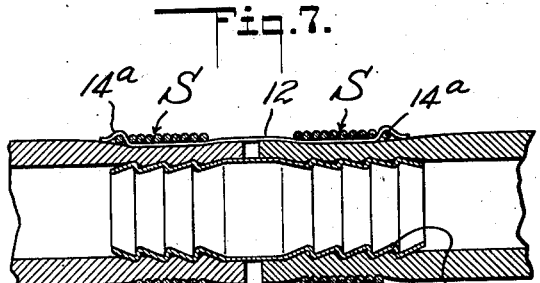
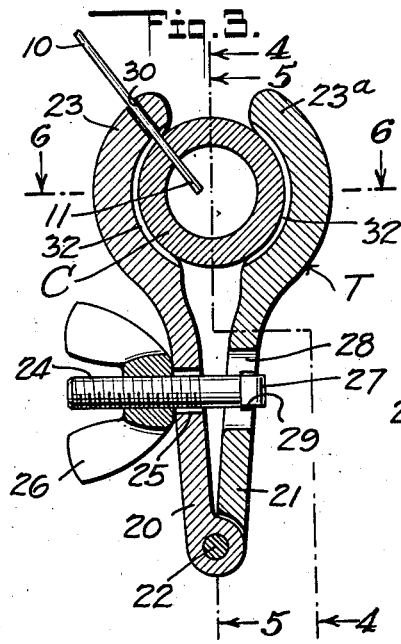
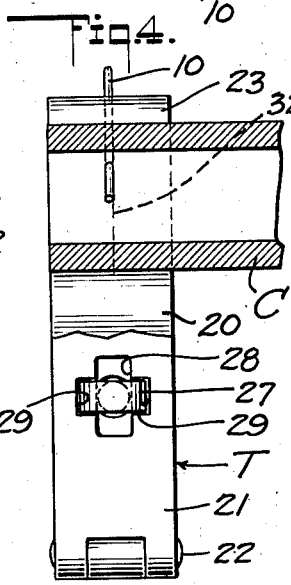
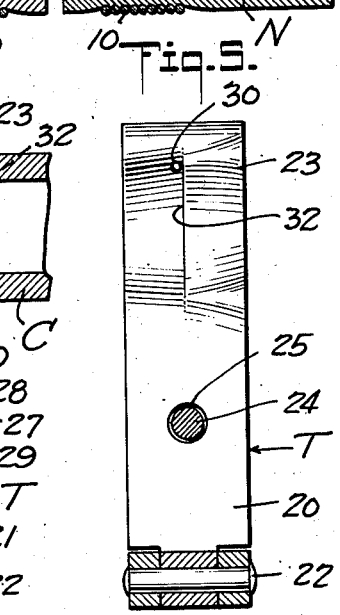
INVENTOR.
CHARLES G. COOPER
BY
Munn, Liddy & Glaccum
ATTORNEYS Patented Mar. 20, 1945

2,371,805

UNITED STATES PATENT OFFICE 2,371,805

CONDUIT COUPLING MEANS

Charles G. Cooper, Yuma, Ariz.

Application August 28, 1942, Serial No. 456,477

6 Claims. (Cl. 140—124)

This invention relates generally to means for coupling sections of conduits together.

An object of this invention is to provide coupling securing means, a tool for applying such means to sections of flexible hose and other conduits, in a manner to co-act with a nipple or other form of coupling member in connecting the sections with the utmost security against leakage of fluid at the connection.

Another object of the invention is to provide means of the above described character by which a coupling member can be secured to a hose section in a few minutes time by a simple manipulation of the tool to constrict the hose section upon the coupling member and make a permanently leakproof joint which is exteriorly smooth and only negligibly increases the diameter of the hose so as to present no projection or any form of obstruction which might interfere with the free and unrestricted handling of the hose.

A further object of the invention is to provide a tool of the general character above set forth, which is adjustable in a manner to accommodate hose of a wide range of dimensions, and is coactable with the coupling securing means in applying the latter to the hose section to obtain the requisite strength for effectively maintaining a permanently leakproof joint irrespective of the intensity of the fluid pressure carried in the hose.

With these and other objects in view, the invention resides in the tool, and in the combinations, arrangements and functional relationships of elements as set forth in the following specification and particularly pointed out in the appended claims.

In the accompanying drawing:

Figure 1 is a view in side elevation, illustrating the securing means embodied in this invention, applied to a conduit and coupling member;

Figure 2 is a sectional view taken on the line 2—2 of Figure 1;

Figure 3 is a longitudinal sectional view of the wire winding tool embodied in the invention;

Figures 4, 5 and 6 are sectional views taken respectively, on the lines 4—4, 5—5 and 6—6 of Figure 3; and, Figure 7 is a view similar to Figure 2 illustrating the invention applied to two conduits to permanently connect them.

Referring specifically to the drawing, the means employed in this invention, broadly comprises a securing means S and a tool T for applying the securing means to a flexible conduit C in which a coupling member M is inserted, all in a manner to constrict the conduit and maintain same constricted about the coupling member to produce a fluid-tight joint therebetween.

The coupling member M as shown in Figures 1 and 2, may be of the screw threaded detachable type in which male and female parts are utilized to connect conduit sections, or may be in the form of a nipple N to permanently connect conduit sections as shown in Figure 7.

With particular reference to Figures 1 and 2, the securing means S is composed of a length of bendable wire 10 of suitable gage and tensile strength, having one end passing through an opening punctured in the wall of the conduit C adjacent an end of the latter, and bent by the coupling member M when inserted into the bore of the conduit, so as to have its end portion 11 confined between the coupling member and conduit wall.

A locking member in the form of a strip 12 of sheet metal preferably has one end hooked around the wire 10 adjacent the opening in the conduit wall through which the wire passes, as shown at 13 in Figure 2, and extends longitudinally to receive a predetermined number of convolutions of the wire. The wire is wound on the conduit and locking strip 12 with sufficient tension to constrict the conduit into fluid-sealing engagement with the coupling member M, and the last convolution of the wire has its free end portion return bent as shown at 14 in Figure 1, and interengaged with the strip 12 by bending the latter over the portion 14 as shown at 15 in Figure 2. The wire 10 and strip 12 are thus locked together to prevent unwinding of the wire and to rigidly connect the first and last convolutions of the wire against lateral separation of the convolutions from their close helical formation shown.

In the use of the securing means S to permanently connect conduit sections together by the nipple N as shown in Figure 7, the locking strip 12 is of such length as to span the overall distance between the last convolutions of wire wound on the two conduit sections, and to be interengaged with the return bent portions 14a of such convolutions in the same manner as illustrated in Figure 2, to thus lock the respective wire bindings or wrappings against unwinding and also provide a tie reinforcing the nipple N in securely connecting the conduit sections together.

The above described method of applying the wire 10 and locking strip 12 to the conduits, can be effected in conjunction with the wire winding tool T, which comprises a pair of clamping members 20 and 21 adjustably connected at one end by being hingedly mounted on a pin 22, and having arcuate jaws 23 and 23a at the other end to receive conduits of widely different diameters therebetween.

Clamping pressure is applied to the jaws 23 and 23a by a screw 24 passing freely through an opening 25 in the jaw 23 and provided with a thumb nut 26. The screw 24 is provided with an elongated rectangular head 27, which, in one position of rotative adjustment of the screw about its longitudinal axis, passes freely through a slot 28 in the jaw 23a to permit unrestricted separation of the jaws, and is adapted to seat in recesses 29 in the jaw 23a, when the screw is turned through an angle of ninety degrees, so as to operatively connect the jaws for relative movement towards each other by screwing movement of the nut 26.

The jaw 23 is provided with an opening 30 through which a puncturing instrument (not shown) or the wire 10 in lieu of such an instrument, is insertable to penetrate the wall of the conduit C when interposed between the jaws as shown in Figure 3. The inner or working faces of the jaws are provided with circumferentially extending radial shoulders 32 which are formed by tapering the working faces from the ends 33 of the jaws as shown in Figures 5 and 6, and it will be noted from Figure 4, that the opening 30 in the jaw 23 communicates with the working face of the latter at the respective shoulder 32. The tapering of the working faces from the ends 33 to the shoulders 32 form a conical die for receiving the coils of the wire 10.

In using the tool T, the conduit C is clamped at an end thereof, lightly between the jaws 23 and 23a, following which the puncturing instrument or the end of the wire 10 from a spool thereof is passed through the opening 30 and forced through the wall of the conduit to project into the bore thereof as shown in Figure 3.

The coupling member M or nipple N is now inserted into the bore of the conduit past the inserted end of the wire 10 so as to bend same in a direction longitudinally of the bore and anchor the bent end of the wire between the wall of the conduit and the coupling member or nipple as the case may be.

Winding of a portion of a convolution of the wire on the conduit is now effected by rotating the tool in a clockwise direction as viewed in Figure 3, following which the tool is unclamped from the conduit sufficiently for the preformed hooked end 13 of the locking strip 12 to be applied to this first convolution of the wire adjacent the punctured opening in the wall of the conduit.

With the locking strip extending longitudinally of the conduit, the tool is reclamped upon the conduit with such pressure, that upon resuming clockwise rotational movement of the tool, the wire will be wound helically upon the locking strip and the conduit, and the conical die formed by the tapering of the working surfaces up to the shoulders 32 will constrict the latter sufficiently to create a binding action of the coiled wire on the hose and produce a leakproof joint around the coupling member. As this wire winding operation proceeds, the shoulders 32 co-act with the wire to feed the tool along the conduit and to crowd the convolutions of the wire into engagement with each other to produce a tight coil. At the same time the conical die forces the coils against the hose.

The length of the inserted end of the coupling member, and the number of convolutions of wire wound upon the conduit can be varied in accordance with the amount of pressure carried in the conduit, so as to produce a fluid-tight joint irrespective of the intensity of the pressure.

When the desired amount of wire binding or wrapping has been applied to the conduit, the wire is severed from the spool, and the end of the last convolution of the wire is bent upon itself as at 14, following which the locking strip 12 has its end 15 bent over the wire and any excess length of the locking strip is cut away therefrom. The tool is now unclamped from the conduit, and, in the case of using the nipple N, is applied to the other conduit and the above described operations repeated, it being understood of course, that in this instance, the locking strip is not hooked over the first convolution of each wire binding, but is a continuous piece forming the reinforcing tie as shown in Figure 7, in addition to its functioning previously described.

It is to be understood that the expression "wire" in the specification and claims should be construed broadly in terms of its function as a binding or wrapping member; and that the expression "locking strip" should be broadly construed in terms of its various functions, (1), as a locking member to prevent unwinding of the wire, (2), as a tie member preventing lateral separation of the convolutions of the wire, and, (3), as a tie member between two conduits in co-action with their respective wire wrappings. Furthermore, the term "conduit" is intended to include any form of support on which a wire binding is tightly wound and locked in accordance with the means and method embodied in this invention.

I claim:

1. A tool comprising a pair of clamping members having hose receiving sections; means adjustably connecting said members to receive flexible conduits of different sizes; one of the members having a wire receiving opening for guiding wire adjacent to the hose for wrapping purposes; said members having cooperating conical recesses and shoulders for providing a conical die that receives the wire from the opening and winds it tightly about the hose as the clamping members are rotated about the hose; the opening feeding the wire adjacent to the shoulders and the shoulders pressing the wire received from the opening against the coil just completed while the conical die forces the coils into the hose for providing a tight, compact helical coil wrapping about the hose.

2. A tool comprising a pair of clamping members having hose receiving sections; means adjustably connecting said members to receive flexible conduits of different sizes, one of the members having a wire receiving opening for guiding wire adjacent to the hose for wrapping purposes; said members having cooperating conical recesses and shoulders for providing a conical die that receives the wire from the opening and winds it tightly about the hose as the clamping members are rotated about the hose; the opening feeding the wire adjacent to the shoulders and the shoulders pressing the wire received from the opening against the coil just completed while the conical die forces the coils into the hose for providing a tight, compact helical coil wrapping about the hose, the opening extending radially with respect to the hose for bending the wire substantially a right angle as it is wound on the hose; this bend creating sufficient gripping action and tension on the wire to cause the tool to wind a tight coil.

3. A tool comprising a pair of clamping members having hose receiving sections; means adjustably connecting said members to receive flexible conduits of different sizes, one of the members having a wire receiving opening for guiding a wire adjacent to the hose for wrapping purposes; said members having cooperating conical recesses and shoulders for providing a conical die that receives the wire from the opening and winds it tightly about the hose as the clamping members are rotated about the hose; the opening feeding the wire adjacent to the shoulders and the shoulders pressing the wire received from the opening against the coil just completed while the conical die forces the coils into the hose for providing a tight, compact helical coil wrapping about the hose, the ends of the clamping members that grip the hose being spaced from each other for providing sufficient space to anchor the cut end of the completed coil after the tool has been rotated to pass the cut end through the opening and bring it into said space between the members; said members holding the coil from unwinding until the cut end is anchored.

4. A tool comprising a pair of clamping members having substantially semi-cylindrical-shaped jaws for receiving a hose or the like; means adjustably connecting the jaws for receiving flexible conduits of different sizes and for applying the desired gripping pressure on the conduit; said jaws having cooperating cone-shaped recesses with substantially semi-annular shoulders disposed about midway between the two sides of the jaws, the sides of the jaws having openings of substantially the same radius; one of the jaws having an opening leading into the recess adjacent to the shoulder for feeding wire into the recess that is to be wound helically about the flexible conduit; said tool when rotated around the conduit wrapping wire therearound, the shoulder causing the successive wire coils to contact each other and the conical recesses clamping the coiled wire firmly against the conduit as the tool is advanced along the conduit during its rotations.

5. A tool comprising a pair of clamping members having substantially semi-cylindrical-shaped jaws for receiving a hose or the like; means adjustably connecting the jaws for receiving flexible conduits of different sizes and for applying the desired gripping pressure on the conduit; said jaws having cooperating cone-shaped recesses with substantially semi-annular shoulders disposed about midway between the two sides of the jaws, the sides of the jaws having openings of substantially the same radius; one of the jaws having an opening leading into the recess adjacent to the shoulder for feeding wire into the recess that is to be wound helically about the flexible conduit; said tool when rotated around the conduit wrapping wire therearound, the shoulder causing the successive wire coils to contact each other and the conical recesses clamping the coiled wire firmly against the conduit as the tool is advanced along the conduit during its rotations, the free ends of the jaws being spaced from each other to provide an exposed portion on the conduit between the jaws for anchoring the free end of the wire after the winding operation has been completed and before the jaws are freed from the conduit; whereby the jaws will hold the coiled wire from uncoiling during this operation.

6. A tool comprising a pair of hinged members having jaws adapted to receive a conduit, means adjustably connecting said members for clamping co-action of their jaws with a conduit, said jaws having a conical-shaped die with a split annular shoulder at one end, one of the jaws having an opening placed adjacent to the shoulder through which an end of a wire is insertable for connection to the conduit, a relative rotation between the tool and conduit causing the wire to be wound around the conduit, the shoulder causing the adjacent wire coils to contact each other while feeding the tool longitudinally along the conduit, and the conical die pressing the wire coils tightly against the conduit.

CHARLES G. COOPER.